(12) United States Patent
Nakatsutsumi et al.

(10) Patent No.: US 10,559,846 B2
(45) Date of Patent: Feb. 11, 2020

(54) NEGATIVE-ELECTRODE ACTIVE MATERIAL FOR NON-AQUEOUS SECONDARY BATTERY AND NON-AQUEOUS SECONDARY BATTERY

(71) Applicant: Panasonic Intellectual Property Management Co., Ltd., Osaka (JP)

(72) Inventors: Takayuki Nakatsutsumi, Osaka (JP); Akira Kano, Osaka (JP); Junko Matsushita, Osaka (JP); Nobuhiko Hojo, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 87 days.

(21) Appl. No.: 15/959,294

(22) Filed: Apr. 23, 2018

(65) Prior Publication Data

US 2018/0337425 A1   Nov. 22, 2018

(30) Foreign Application Priority Data

May 16, 2017   (JP) .................................. 2017-097703
Jan. 12, 2018   (JP) .................................. 2018-003746

(51) Int. Cl.
| | | |
|---|---|---|
| *H01M 10/0525* | (2010.01) | |
| *H01M 4/133* | (2010.01) | |
| *H01M 2/20* | (2006.01) | |
| *H01M 4/583* | (2010.01) | |
| *H01M 4/134* | (2010.01) | |

(Continued)

(52) U.S. Cl.
CPC ....... *H01M 10/0525* (2013.01); *C01B 32/205* (2017.08); *C01B 32/21* (2017.08); *H01M 2/204* (2013.01); *H01M 4/133* (2013.01); *H01M 4/134* (2013.01); *H01M 4/366* (2013.01); *H01M 4/381* (2013.01); *H01M 4/583* (2013.01); *H01M 4/587* (2013.01); *H01M 4/5835* (2013.01);

(Continued)

(58) Field of Classification Search
None
See application file for complete search history.

(56) References Cited

U.S. PATENT DOCUMENTS 5,498,493 A     3/1996  Dahn et al.
6,485,864 B1 *  11/2002 Miyazawa .............. C01B 32/20
                                                     423/448

(Continued)

FOREIGN PATENT DOCUMENTS

| JP | 7-073898 | 3/1995 |
| JP | 9-063585 | 3/1997 |
| JP | 2006-260847 | 9/2006 |

*Primary Examiner* — Scott J. Chmielecki
(74) *Attorney, Agent, or Firm* — McDermott Will & Emery LLP

(57) ABSTRACT

A negative-electrode active material comprises a graphite including at least boron and fluorine. The fluorine is disposed at least on a surface of the graphite. A ratio R satisfies $0.5 \leq R \leq 1$, where $R = S_{BB}/S_B$, and $S_B$ denotes a total peak area of a boron 1s spectrum of the graphite obtained by X-ray photoelectron spectroscopy, and $S_{BB}$ denotes a peak area of all spectra each having a peak in a binding energy range of not less than 184.0 eV and not more than 188.5 eV in the boron 1s spectrum.

12 Claims, 4 Drawing Sheets

(51) Int. Cl.
  *H01M 4/66* (2006.01)
  *H01M 4/38* (2006.01)
  *C01B 32/21* (2017.01)
  *H01M 4/587* (2010.01)
  *H01M 4/36* (2006.01)
  *H01M 4/62* (2006.01)
  *C01B 32/205* (2017.01)
  *H01M 4/02* (2006.01)

(52) U.S. Cl.
  CPC ............. *H01M 4/62* (2013.01); *H01M 4/662* (2013.01); *H01M 2004/027* (2013.01); *H01M 2004/028* (2013.01)

(56) References Cited

U.S. PATENT DOCUMENTS

| | | | | |
|---|---|---|---|---|
| 2002/0192555 A1* | 12/2002 | Teshima | .............. | H01M 4/1393 429/231.8 |
| 2007/0215460 A1* | 9/2007 | Tojo | ........................ | C25B 1/245 204/245 |
| 2018/0151873 A1* | 5/2018 | Matsuno | ............. | H01M 4/0459 |

* cited by examiner

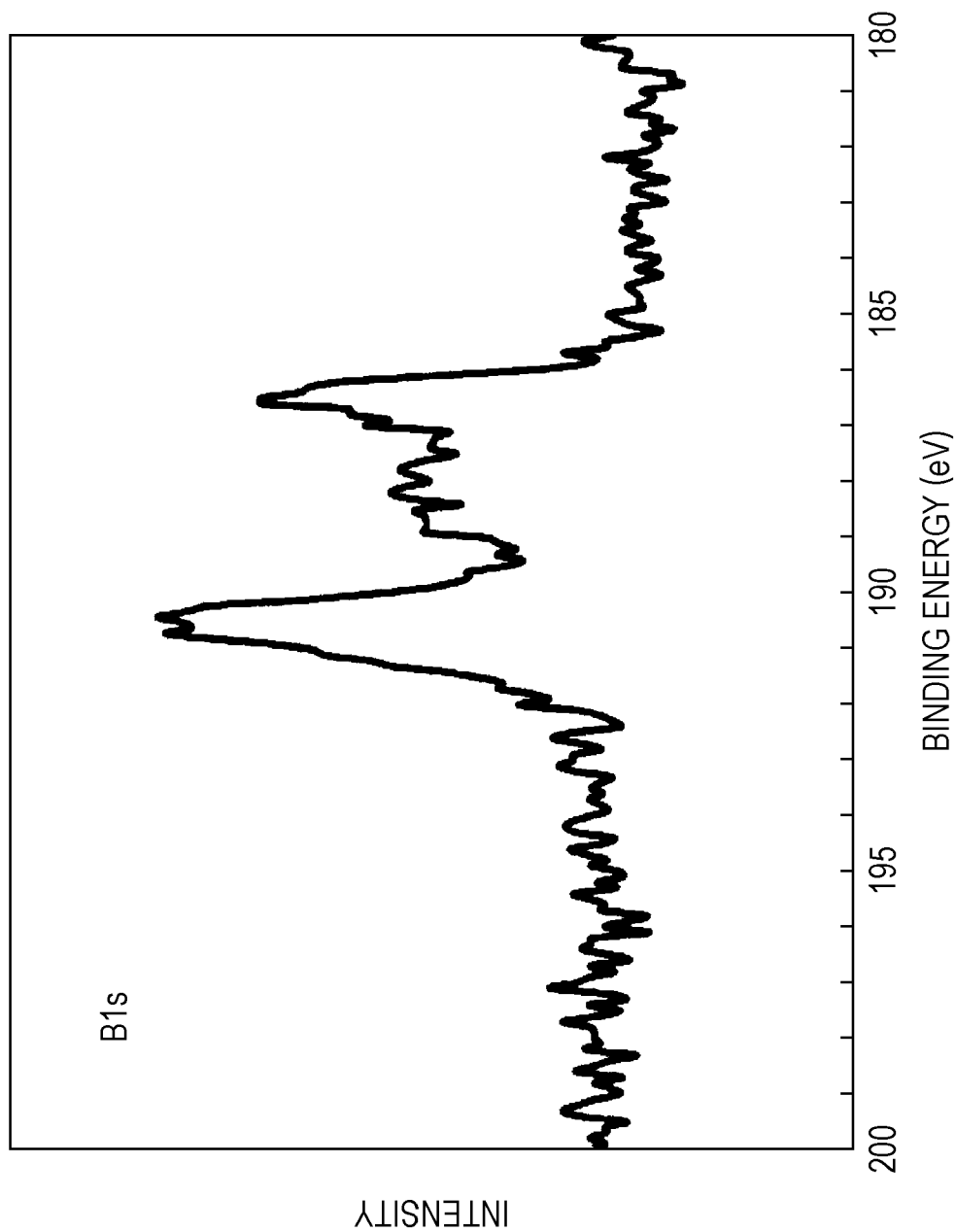

NEGATIVE-ELECTRODE ACTIVE MATERIAL FOR NON-AQUEOUS SECONDARY BATTERY AND NON-AQUEOUS SECONDARY BATTERY

BACKGROUND

1. Technical Field

The present disclosure relates to a non-aqueous secondary battery and a negative-electrode active material for use in the non-aqueous secondary battery.

2. Description of the Related Art

Carbon materials containing boron have been studied as negative-electrode materials for non-aqueous secondary batteries exemplified by lithium-ion secondary batteries (see Japanese Unexamined Patent Application Publications No. 7-73898 and No. 9-63585, for example).

SUMMARY

One non-limiting and exemplary embodiment provides a highly reliable negative-electrode active material reducing a decrease in discharge capacity density.

In one general aspect, the techniques disclosed here feature a negative-electrode active material for a non-aqueous secondary battery. The negative-electrode active material comprises a graphite including at least boron and fluorine. The fluorine is disposed at least on a surface of the graphite. A ratio R satisfies $0.5 \leq R \leq 1$, where $R = S_{BB}/S_B$, and $S_B$ denotes a total peak area of a boron 1s spectrum of the graphite obtained by X-ray photoelectron spectroscopy, and $S_{BB}$ denotes a peak area of all spectra each having a peak in a binding energy range of not less than 184.0 eV and not more than 188.5 eV in the boron 1s spectrum.

A negative-electrode active material for a non-aqueous secondary battery according to an embodiment of the present disclosure has high reliability, reducing a decrease in discharge capacity density.

It should be noted that general or specific embodiments may be implemented as an active material, a battery, a device, a method, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is an enlarged view of the spectrum of FIG. 4.

DETAILED DESCRIPTION

Figure 1:
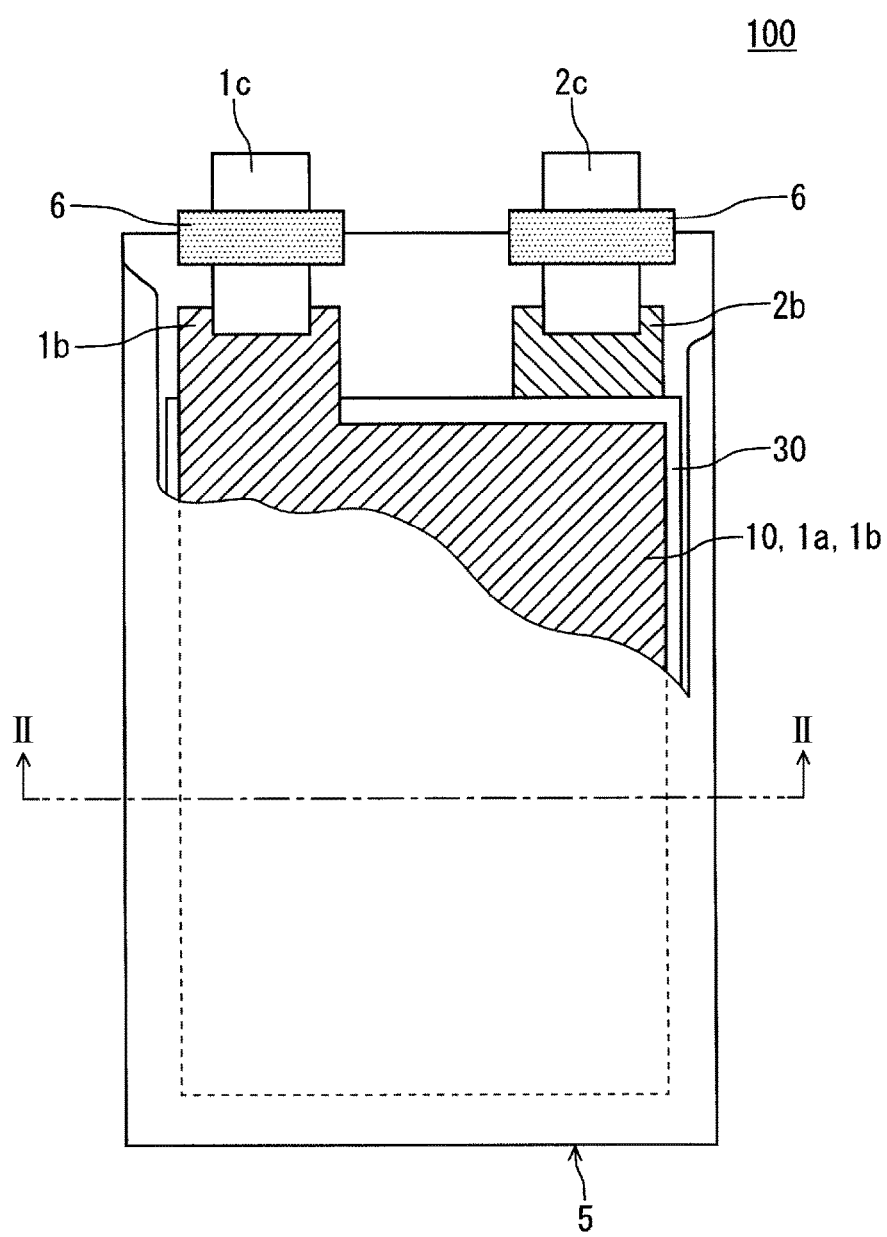
FIG. 1 is a schematic cutaway plan view illustrating the structure of a non-aqueous secondary battery according to one embodiment of the present disclosure.

Lithium-ion secondary batteries including a negative electrode containing graphite, which can occlude a large amount of lithium in the graphite skeleton and reversibly release the lithium, can have high discharge capacity densities. However, graphite is likely to cause a side reaction with an electrolytic solution.

Thus, it is difficult for lithium-ion secondary batteries including a negative electrode containing graphite both to suppress side reactions and to have a high discharge capacity density. As a result of extensive studies to suppress side reactions between graphite and an electrolytic solution and to achieve a high discharge capacity density, the present inventors have conceived a negative-electrode active material for a non-aqueous secondary battery of the present disclosure.

Embodiments of the present disclosure will be described in detail below. However, the present disclosure is not limited to these embodiments.

A negative-electrode active material for a non-aqueous secondary battery according to an embodiment of the present disclosure contains a graphite that contains boron and fluorine. Such a structure can provide a highly reliable negative electrode for a non-aqueous secondary battery with a high discharge capacity density. Although the reason for enabling both of the high discharge capacity density and suppression of side reactions of such a negative-electrode active material for a non-aqueous secondary battery is not completely clear, the present inventors guess the reason as described below. However, the present disclosure is not limited by the following discussion. Desorption of lithium ions from a negative electrode is hereinafter referred to as discharge, and adsorption of lithium ions onto the negative electrode is hereinafter referred to as charge.

A negative electrode containing graphite is likely to cause a side reaction. This is probably because graphite has a low charge potential and a low discharge potential, and thus has high reducing power. Therefore, reductive decomposition of a non-aqueous electrolytic solution on the surface of the negative electrode is likely caused as a side reaction.

In contrast, in an embodiment of the present disclosure, boron atoms in the graphite skeleton increase the charge potential and discharge potential of the graphite. This decreases the reducing power of the negative electrode, which is responsible for a side reaction with an electrolytic solution, and thereby suppresses a side reaction with the electrolytic solution and improves reliability.

Boron-free graphite, which can occlude many lithium ions in its skeleton and reversibly release the lithium ions, has a high discharge capacity density. Like boron-free graphite, boron-containing graphite can also occlude many lithium ions. However, part of lithium ions occluded on boron-containing graphite may be trapped (e.g., fixed) by boron or boron-derived defects on the surface of the graphite. Trapped lithium ions cannot be reversibly released and do not contribute to charge-discharge. Thus, the discharge capacity decreases with the number of boron sites or boron-derived defect sites that trap lithium ions.

In contrast, in an embodiment of the present disclosure, fluorine on the surface of the graphite inhibits boron from trapping lithium ions. This suppresses a decrease in discharge capacity and results in a high discharge capacity density similar to that of boron-free graphite.

However, fluorine deep from the surface of the graphite may decrease the number of lithium ions to be occluded on the graphite and decrease the discharge capacity density. In order to maintain a high discharge capacity density, it is desirable that fluorine be localized in a region approximately 100 nm or less in depth from the surface of boron- and fluorine-containing graphite particles. The term "localized", as used herein, means that the density of fluorine in the region is higher than the density of fluorine in the other region of graphite particles.

Such a structure can provide a negative-electrode active material containing graphite with a high discharge capacity density and improved reliability.

A ratio R of $S_{BB}$ to $S_B$ (i.e., $S_{BB}/S_B$, hereinafter also referred to as "ratio $S_{BB}/S_B$") is 0.5 or more, wherein $S_B$ denotes the total peak area of a boron 1s spectrum of the graphite obtained by X-ray photoelectron spectroscopy, and $S_{BB}$ denotes the peak area of all spectra each having a peak in the binding energy range of not less than 184.0 eV and not more than 188.5 eV in the boron 1s spectrum.

A boron spectrum obtained by X-ray photoelectron spectroscopy (XPS) includes at least one spectrum each of which has a peak in the binding energy range of 184.0 to 188.5 eV. The at least one spectrum includes a spectrum of solid solution of boron in the graphite skeleton and/or one or more spectra of boron in bonding states similar to that of the solid solution of boron. The phrase "peak area of all spectra each having a peak in the binding energy range of not less than 184.0 eV and not more than 188.5 eV", as used herein, refers to the total peak area of a spectrum of solid solution of boron in the graphite skeleton and/or one or more spectra of boron in bonding states similar to that of the solid solution of boron. Thus, an $S_{BB}/S_B$ ratio of a certain value or more means that among the total boron on the surface of the graphite, solid solution of boron in the graphite skeleton or boron in a bonding state similar to that of the solid solution of boron accounts for a certain value or more. A higher proportion of boron in such a bonding state can result in a higher charge potential and a higher discharge potential of the graphite, and thereby a higher side reaction suppressing effect can be achieved. The $S_{BB}/S_B$ ratio desirably ranges from 0.5 to 0.8, more desirably 0.5 to 0.7.

A spectrum of boron nitride possibly formed during synthesis has a binding energy in the range of 189.0 to 192.0 eV and does not have a binding energy in the range of 184.0 to 188.5 eV. Thus, an $S_{BB}/S_B$ ratio of a certain value or more means that among the total boron on the surface of the graphite, boron nitride or boron in a bonding state similar to that of boron nitride accounts for less than a certain value.

Boron nitride or a boron compound in a bonding state similar to that of boron nitride cannot reversibly occlude or release lithium ions. Thus, an excessive boron nitride or an excessive boron compound in a bonding state similar to that of boron nitride may result in a decrease in discharge capacity density. The proportion of boron nitride or a boron compound in a bonding state similar to that of boron nitride can be limited to less than a certain value (50%) to maintain a high discharge capacity density.

X-ray photoelectron spectroscopy analyzes the element composition and chemical bonding state of a surface of a sample by irradiating the surface of the sample with X-rays and measuring the kinetic energy of photoelectrons released from the surface of the sample. The peak areas $S_{BB}$ and $S_B$ can be measured and calculated under the following conditions. A graphite C1s spectrum (248.5 eV) can be used for energy calibration.

Measuring apparatus: PHI 5000 VersaProbe manufactured by ULVAC-PHI, Inc.
X-ray source: monochromatic Mg-Kα radiation, 200 nmΦ, 45 W, 17 kV
Area of analysis: approximately 200 μmΦ

The peak area $S_B$ of the boron 1s spectrum can be calculated as the total peak area of a spectrum in the binding energy range of 184.0 to 196.5 eV. $S_{BB}$ can be calculated by separating all spectra each having a peak in the range of 184.0 to 188.5 eV, and then determining the area of the spectra. The range of 184.0 to 188.5 eV is a range of the boron 1s spectrum except a component of boron bonded to nitrogen.

Figure 4:
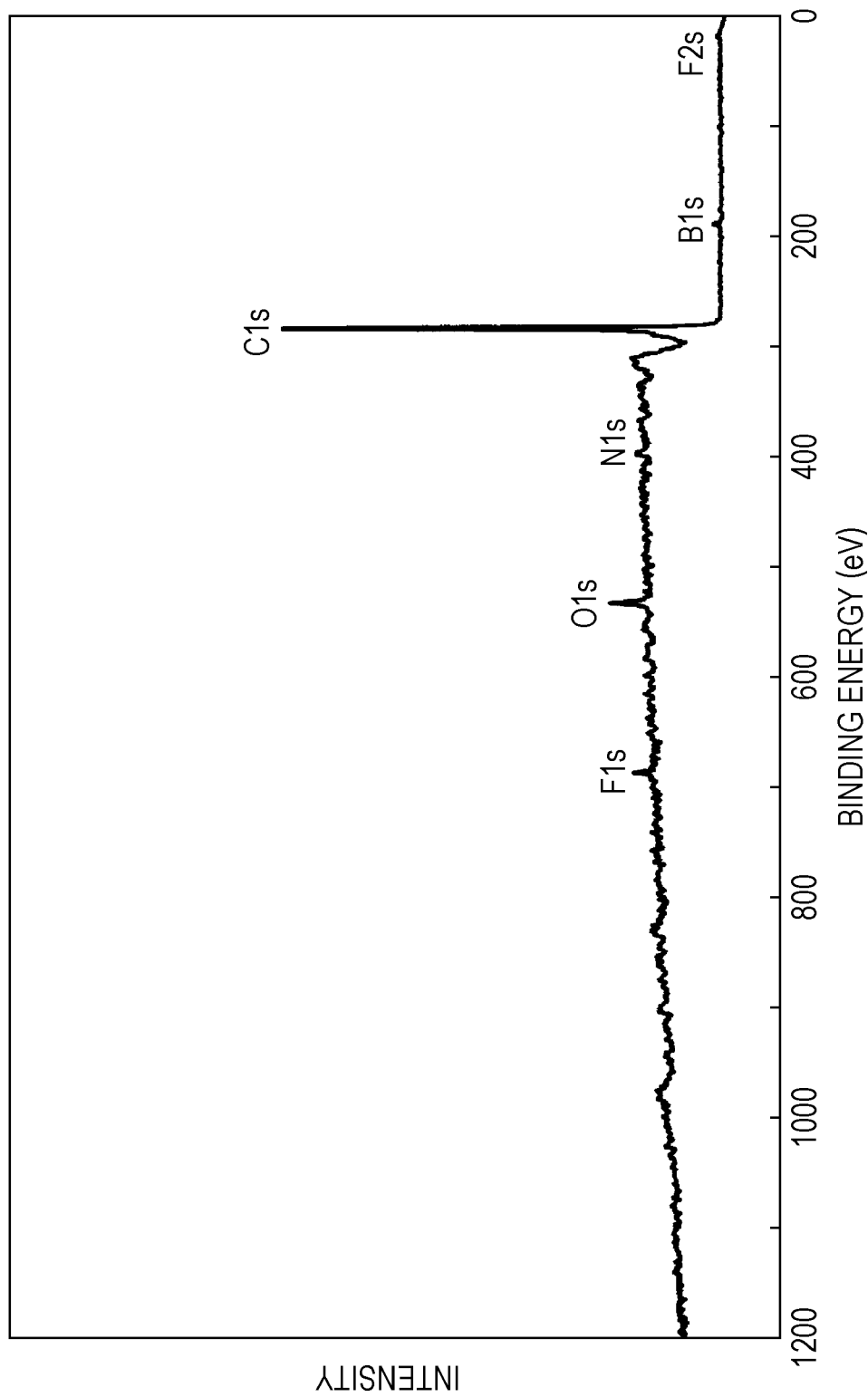
FIG. 4 is a whole spectrum of a graphite of Example 1 obtained by X-ray photoelectron spectroscopy.

FIG. 4 shows a spectrum of a graphite of Example 1 described later obtained by X-ray photoelectron spectroscopy. In FIG. 4, the spectrum of the graphite of Example 1 includes a boron 1s spectrum (B1s in the figure), a carbon 1s spectrum (C1s in the figure), and a nitrogen 1s spectrum (N1s in the figure). FIG. 5 is an enlarged view of the spectrum of FIG. 4 in the binding energy range of 180.0 to 200.0 eV. The spectrum in FIG. 5 includes the boron 1s spectrum having a plurality of peaks. The peak areas $S_B$ and $S_{BB}$ can be calculated from the boron 1s spectrum by automatic integration.

The boron content of the graphite is desirably 0.01% or more by mass of the total amount of the graphite, and desirably 5% or less by mass of the total amount of the graphite. A graphite with a boron content of 5% or less by mass can suppress the formation of by-products not involved in adsorption or desorption of lithium ions and achieve a high discharge capacity density. A graphite with a boron content of 0.01% or more by mass can sufficiently suppress side reactions. In consideration of reliability and the discharge capacity density, the graphite desirably has a boron content in the range of 0.01% to 5% by mass, more desirably 0.1% to 1% by mass, still more desirably 0.1% to 0.5% by mass.

In an exemplary method for synthesizing a negative-electrode active material, a graphite material containing boron and fluorine can be produced by synthesizing a boron-containing graphite and heat-treating the boron-containing graphite in an atmosphere containing fluorine. The heat-treatment temperature desirably ranges from approximately 100° C. to 300° C.

In the synthesis of a boron-containing graphite, for example, a carbon precursor material is mixed with a boron raw material and is fired at a temperature in the range of approximately 2100° C. to 3000° C. in an inert gas atmosphere to promote graphitization and to facilitate solid solution of boron in the carbon skeleton. The firing atmosphere desirably contains an inert gas, such as nitrogen or argon.

In firing in a nitrogen gas atmosphere, boron on the surface of the graphite reacts with nitrogen and forms boron nitride, which does not contribute to discharge capacity. This also decreases the proportion of solid solution of boron in the graphite skeleton. In order to maintain a high discharge capacity density and further suppress side reactions, it is desirable to control the amount of boron nitride on the surface of the graphite such that the $S_{BB}/S_B$ ratio can have a certain value or more, as described later.

The carbon precursor material may be soft carbon, such as petroleum coke or coal coke. The soft carbon may have the shape of sheet, fiber, or particles. The carbon precursor material may be synthetic resin having the shape of particles or short fibers in size of a few to tens of micrometers, in consideration of processing after firing. Carbon serving as a raw material can also be produced by heat-treating an organic material, such as a synthetic resin, at a temperature in the range of approximately 800° C. to 1000° C. to evaporate elements other than carbon.

Examples of the boron raw material include boron, boric acid, boron oxide, boron nitride, and diborides, such as aluminum diboride and magnesium diboride. The mass ratio of boron to carbon in the carbon and boron raw materials may range from 0.01% to 5%. During high-temperature firing, part of boron is sometimes not incorporated into the carbon material and volatilizes. Thus, the boron content of the carbon material may be decreased by firing.

The boron raw material may be added after graphitization of the carbon precursor material. More specifically, a graphite material according to the present embodiment can be produced by adding the boron raw material to the material subjected to graphitization, firing the material again at a temperature in the range of approximately 2100° C. to 3000° C., and heat-treating the material at a temperature in the range of approximately 100° C. to 300° C. in an atmosphere containing fluorine.

If the graphite contains excessive boron nitride, for example, boron nitride on the surface of the graphite may be partly removed by heat treatment in a nitrogen-free atmosphere. Thus, a graphite material with an $S_{BB}/S_B$ ratio of a certain value or more can be produced.

Graphite is the generic name of a carbon material that contains a region having a structure including planes of carbon atoms arranged in hexagonal arrays with the planes stacked regularly. Examples of graphite include natural graphite, artificial graphite, and graphitized mesophase carbon particles. The (002) interplanar spacing $d_{002}$ (the interplanar spacing between planes of carbon atoms) measured by X-ray diffractometry is utilized as a measure of the growth of a graphite crystal structure. In general, highly crystalline carbon with $d_{002}$ of 3.4 angstroms or less and a crystallite size of 100 angstroms or more is referred to as graphite. The crystallite size can be measured by the Scherrer method, for example.

A non-aqueous secondary battery containing the negative-electrode active material will be described below.

The non-aqueous secondary battery includes a positive electrode, a negative electrode, and a non-aqueous electrolytic solution.

The positive electrode contains a positive-electrode active material that can occlude and release alkali metal ions. The negative electrode contains a negative-electrode active material. The negative-electrode active material contains the boron- and fluorine-containing graphite described above. The non-aqueous electrolytic solution contains an alkali metal salt composed of an alkali metal ion and an anion dissolved in a non-aqueous solvent. The alkali metal ion is a lithium ion, for example. The alkali metal ion may be another alkali metal ion, such as a sodium ion.

Such a non-aqueous secondary battery can have a high discharge capacity density and high reliability.

Figure 2:
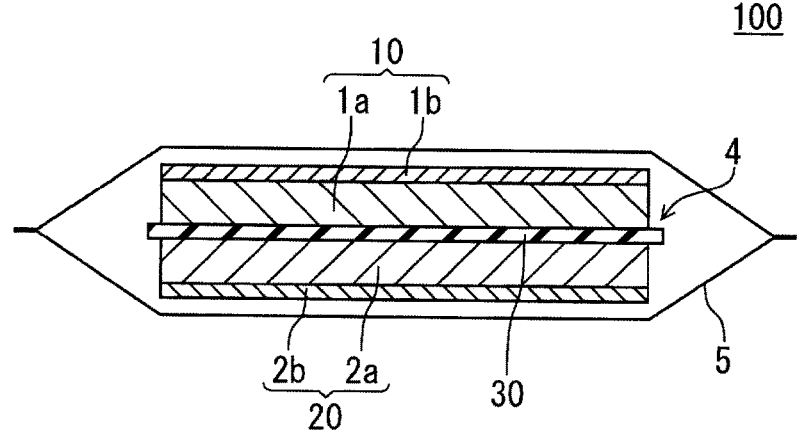
FIG. 2 is a cross-sectional view taken along the line II-II of the non-aqueous secondary battery illustrated in FIG. 1.

A lithium-ion secondary battery will be described below with reference to FIGS. 1 and 2 as an example of a non-aqueous secondary battery according to one embodiment of the present disclosure. FIG. 1 is a schematic cutaway plan view of a non-aqueous secondary battery (for example, a lithium-ion secondary battery). FIG. 2 is a cross-sectional view taken along the line II-II of FIG. 1.

As illustrated in FIGS. 1 and 2, a lithium-ion secondary battery 100 is a sheet-type battery and includes an electrode assembly 4 and a casing 5 for the electrode assembly 4.

The electrode assembly 4 includes a positive electrode 10, a separator 30, and a negative electrode 20 stacked in this order. The positive electrode 10 faces the negative electrode 20 with the separator 30 interposed therebetween. The electrode assembly 4 is thus formed. The electrode assembly 4 is impregnated with a non-aqueous electrolytic solution (not shown).

The positive electrode 10 includes a positive-electrode mixture layer 1a and a positive-electrode current collector 1b. The positive-electrode mixture layer 1a is formed on the positive-electrode current collector 1b.

The negative electrode 20 includes a negative-electrode mixture layer 2a and a negative-electrode current collector 2b. The negative-electrode mixture layer 2a is formed on the negative-electrode current collector 2b.

The positive-electrode current collector 1b is connected to a positive-electrode tape automated bonding (tab) lead 1c, and the negative-electrode current collector 2b is connected to a negative-electrode tab lead 2c. The positive-electrode tab lead 1c and the negative-electrode tab lead 2c extend outside the casing 5.

The spaces between the positive-electrode tab lead 1c and the casing 5 and between the negative-electrode tab lead 2c and the casing 5 are insulated by an insulating tab film 6.

The positive-electrode mixture layer 1a contains a positive-electrode active material that can occlude and release alkali metal ions. The positive-electrode mixture layer 1a may contain a conductive aid, an ionic conductor, and a binder, as required. The positive-electrode active material, conductive aid, ionic conductor, and binder may contain any known material.

The positive-electrode active material may be any material that can occlude and release one or more alkali metal ions, for example, a transition metal oxide, a transition metal fluoride, a polyanionic material, a fluorinated polyanionic material, or a transition metal sulfide, each containing an alkali metal. For example, the positive-electrode active material is a lithium-containing transition metal oxide, a lithium-containing polyanionic material, or a sodium-containing transition metal oxide. The lithium-containing transition metal oxide is, for example, $Li_xMe_yO_2$ or $Li_{1+x}Me_yO_3$ (where x satisfies 0<x≤1, y satisfies 0.95≤y<1.05, and Me contains at least one selected from the group consisting of Co, Ni, Mn, Fe, Cr, Cu, Mo, Ti, and Sn). The lithium-containing polyanionic material is, for example, $Li_xMe_yPO_4$ or $Li_xMe_yP_2O_7$ (where x satisfies 0<x≤1, y satisfies 0.95≤y<1.05, and Me contains at least one selected from the group consisting of Co, Ni, Mn, Fe, Cu, and Mo). The sodium-containing transition metal oxide is, for example, $Na_xMe_yO_2$ (where x satisfies 0<x≤1, y satisfies 0.95≤y<1.05, and Me contains at least one selected from the group consisting of Co, Ni, Mn, Fe, Cr, Cu, Mo, Ti, and Sn).

The positive-electrode current collector 1b may be a porous or nonporous sheet or film formed of a metal material, such as aluminum, an aluminum alloy, stainless steel, nickel, or a nickel alloy. Aluminum and alloys thereof, which are inexpensive and can be easily formed into a thin film, are suitable for the positive-electrode current collector 1b. In order to decrease the resistance, provide catalytic effects, and strengthen the bonding between the positive-electrode mixture layer 1a and the positive-electrode current collector 1b, a carbon material, such as carbon, may be applied to the positive-electrode current collector 1b.

The negative-electrode mixture layer 2a contains a graphite material containing boron and fluorine according to the present embodiment as a negative-electrode active material. The negative-electrode mixture layer 2a may further contain another negative-electrode active material that can occlude and release alkali metal ions, as required. The negative-electrode mixture layer 2a may contain a conductive aid, an ionic conductor, and a binder, as required. The active materials, conductive aid, ionic conductor, and binder may contain any known material.

A negative-electrode active material that may be used in combination with a negative-electrode active material according to the present embodiment may be a material that occludes and releases alkali metal ions or may be an alkali metal. The material that occludes and releases alkali metal ions may be an alkali metal alloy, carbon, a transition metal oxide, or a silicon material. More specifically, the negative-electrode material for a lithium secondary battery may be an alloy of a metal, such as Zn, Sn, or Si, and lithium, carbon, such as artificial graphite, natural graphite, or non-graphitizable amorphous carbon, a transition metal oxide, such as $Li_4Ti_5O_{12}$, $TiO_2$, or $V_2O_5$, $SiO_x$ (0<x≤2), or lithium metal.

Examples of the conductive aid include carbon materials, such as carbon black, graphite, and acetylene black, and electrically conductive polymers, such as polyaniline, polypyrrole, and polythiophene. Examples of the ionic conductor include gel electrolytes, such as poly(methyl methacrylate), and solid electrolytes, such as poly(ethylene oxide), lithium phosphate, and lithium phosphorus oxynitride (LiPON). Examples of the binder include poly(vinylidene difluoride), vinylidene fluoride-hexafluoropropylene copolymers, vinylidene fluoride-tetrafluoroethylene copolymers, polytetrafluoroethylene, carboxymethylcellulose, poly(acrylic acid), styrene-butadiene copolymer rubber, polypropylene, polyethylene, and polyimide.

The negative-electrode current collector 2b may be a porous or nonporous sheet or film formed of a metal material, such as aluminum, an aluminum alloy, stainless steel, nickel, a nickel alloy, copper, or a copper alloy. Copper and alloys thereof, which are stable at the operating potential of the negative electrode and are relatively inexpensive, are suitable for the material of the negative-electrode current collector 2b. The sheet or film may be a metal foil or metal mesh. In order to decrease the resistance, provide catalytic effects, and strengthen the bonding between the negative-electrode mixture layer 2a and the negative-electrode current collector 2b, a carbon material, such as carbon, may be applied to the negative-electrode current collector 2b.

The separator 30 may be a porous film formed of polyethylene, polypropylene, glass, cellulose, or ceramic. The pores of the separator 30 are filled with a non-aqueous electrolytic solution.

The non-aqueous electrolytic solution is a solution of an alkali metal salt in a non-aqueous solvent. The non-aqueous solvent may be a known cyclic carbonate, chain carbonate, cyclic carboxylate, chain carboxylate, chain nitrile, cyclic ether, or chain ether. The non-aqueous solvent desirably contains a cyclic carbonate and a chain carbonate in terms of the solubility of a Li salt and viscosity.

Examples of the cyclic carbonate include ethylene carbonate, fluoroethylene carbonate, propylene carbonate, butylene carbonate, vinylene carbonate, vinyl ethylene carbonate, and derivatives thereof. These may be used alone or in combination. From the perspective of the ionic conductivity of the electrolytic solution, it is desirable to use at least one selected from the group consisting of ethylene carbonate, fluoroethylene carbonate, and propylene carbonate.

Examples of the chain carbonate include dimethyl carbonate, ethyl methyl carbonate, and diethyl carbonate. These may be used alone or in combination.

Examples of the cyclic carboxylate include γ-butyrolactone and γ-valerolactone. These may be used alone or in combination.

Examples of the chain carboxylate include methyl acetate, ethyl acetate, propyl acetate, methyl propionate, ethyl propionate, and propyl propionate. These may be used alone or in combination.

Examples of the chain nitrile include acetonitrile, propionitrile, butyronitrile, valeronitrile, isobutyronitrile, and pivalonitrile. These may be used alone or in combination.

Examples of the cyclic ether include 1,3-dioxolane, 1,4-dioxolane, tetrahydrofuran, and 2-methyltetrahydrofuran. These may be used alone or in combination.

Examples of the chain ether include 1,2-dimethoxyethane, dimethyl ether, diethyl ether, dipropyl ether, ethyl methyl ether, diethylene glycol dimethyl ether, diethylene glycol diethyl ether, and diethylene glycol dibutyl ether. These may be used alone or in combination.

The hydrogen atoms of these solvents may be partly substituted with fluorine. Thus, these solvents may be fluorinated solvents. A solvent containing fluorine produced by substitution of part of the hydrogen atoms with fluorine can provide a dense film on the negative electrode. Such a dense film on the negative electrode can suppress the continuous decomposition of the electrolytic solution and can thereby provide a highly reliable secondary battery with less side reactions.

Examples of the alkali metal salt to be dissolved in the non-aqueous solvent include lithium salts, such as $LiClO_4$, $LiBF_4$, $LiPF_6$, $LiN(SO_2F)_2$, $LiN(SO_2CF_3)_2$, and lithium bisoxalate borate (LiBOB), and sodium salts, such as $NaClO_4$, $NaBF_4$, $NaPF_6$, $NaN(SO_2F)_2$, and $NaN(SO_2CF_3)_2$. In particular, it is desirable to use a lithium salt in terms of the overall characteristics of the non-aqueous secondary battery. It is particularly desirable to use at least one selected from the group consisting of $LiBF_4$, $LiPF_6$, and $LiN(SO_2F)_2$ in terms of ionic conductivity.

The number of moles of alkali metal salt in the non-aqueous electrolytic solution in the present embodiment is desirably, but not limited to, in the range of 0.5 to 2.0 mol/L. It is reported that high-salt-concentration electrolytic solutions with a mole ratio of an alkali metal salt to solvent being in the range of 1:1 to 1:4 can also be used for charge-discharge in the same manner as in ordinary electrolytic solutions. Thus, such a high-concentration electrolytic solution may also be used.

There are various types (e.g., shapes) of secondary batteries, such as a coin type, a button type, a multilayer type, a cylindrical type, a flat type, and a square or rectangular type, as well as a sheet type illustrated in FIGS. 1 and 2. A non-aqueous secondary battery according to the present embodiment can be applied to a non-aqueous secondary battery of any shape. The uses of a secondary battery according to the present embodiment include, but are not limited to, personal digital assistants, portable electronic devices, household power storage systems, industrial power storage systems, motorcycles, electric vehicles (EVs), and plug-in hybrid electric vehicles (PHEVs).

The embodiments of the present disclosure will be further described in the following examples.

Example 1

(1) Synthesis of Negative-Electrode Active Material

A petroleum coke powder with an average particle size of 12 μm and boric acid (CAS No. 10043-35-3) were ground in an agate mortar. The boric acid was 10% by mass of the petroleum coke powder (boron was 1.7% by mass of the petroleum coke powder). The mixture was then heated from room temperature to 2800° C. at 10° C./min in a tube furnace in an Ar atmosphere (Ar gas flow rate: 1 L/min) and was held at 2800° C. for 1 hour. Subsequently, heating was stopped. After natural cooling, the carbon material was removed from the furnace. The resulting graphite material had an average particle size (median size) of 20 μm measured by laser diffractometry.

The material was heated from room temperature to 200° C. at 10° C./min in a tube furnace in an $F_2$ atmosphere ($F_2$ gas flow rate: 1 L/min) and was held at 200° C. for 2 hours. The graphite material thus produced was ground in an agate mortar and was classified through a stainless steel standard sieve with an opening of 40 μm. Thus, a negative-electrode active material for a non-aqueous secondary battery was produced.

The graphite in the negative-electrode active material had a boron content of 0.34% by weight as determined by inductively coupled plasma (ICP) spectrometry.

An analysis of the surface of the graphite by X-ray photoelectron spectroscopy (XPS) showed a boron 1s spectrum in the binding energy range of 184.0 to 196.5 eV and a fluorine 1s spectrum in the binding energy range of 680.0 to 693.5 eV.

The ratio R (i.e., $S_{BB}/S_B$) was 0.55, wherein $S_B$ denotes the total peak area of the boron 1s spectrum of the graphite obtained by X-ray photoelectron spectroscopy, and $S_{BB}$ denotes the peak area of all spectra each having a peak in the binding energy range of 184.0 to 188.5 eV in the boron 1s spectrum.

An XPS measurement while etching the surface of the graphite with an Ar ion gun (2 kV, 7 mA) showed that the fluorine 1s spectrum was observed from the outermost surface to the depth of 80 nm.

(2) Preparation of Test Electrode

The negative-electrode active material for a non-aqueous secondary battery produced by the synthesis method, carboxymethylcellulose (CAS No. 9000-11-7), and a styrene-butadiene copolymer rubber (CAS No. 9003-55-8) were dispersed in pure water at a weight ratio of 97:2:1 to prepare a slurry. The slurry was applied to the negative-electrode current collector 2b formed of a copper foil 10 μm in thickness with a coating machine and was rolled with a rolling mill to form an electrode sheet.

Figure 3A:
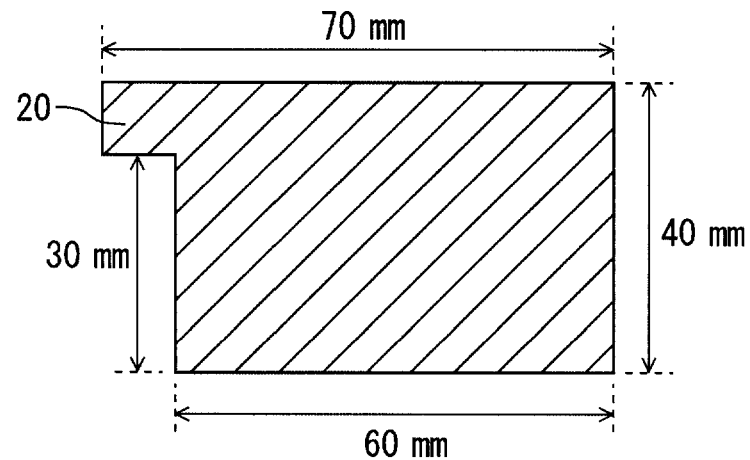
FIG. 3A is an explanatory view of a method for preparing a negative electrode for performance evaluation.
Figure 3B:
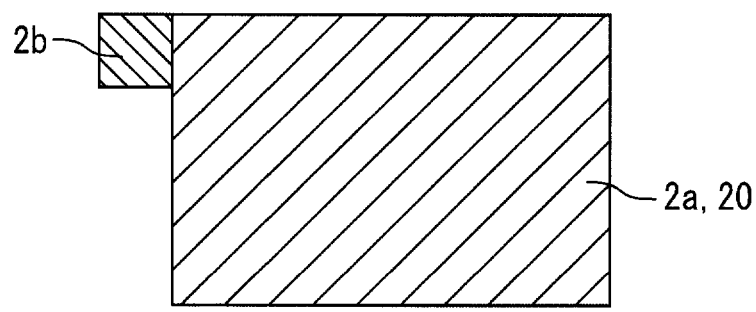
FIG. 3B is an explanatory view of a method for preparing a negative electrode for performance evaluation.
Figure 3C:
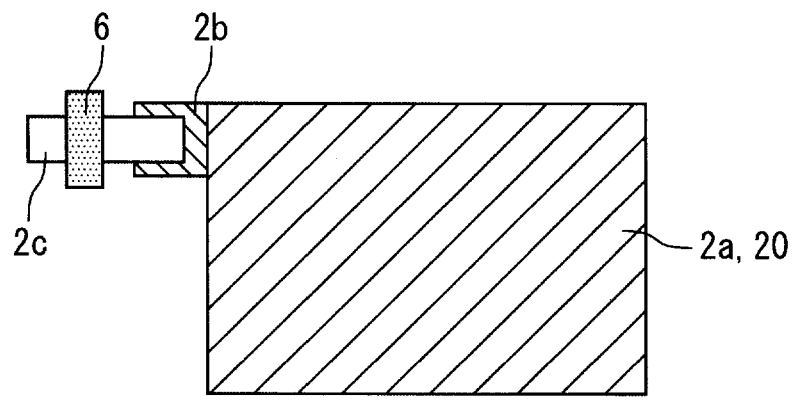
FIG. 3C is an explanatory view of a method for preparing a negative electrode for performance evaluation.

The rolled electrode sheet was cut in the shape illustrated in FIG. 3A to prepare the negative electrode 20 for performance evaluation. In FIG. 3A, a 60 mm×40 mm region functions as a negative electrode, and a 10 mm×10 mm protrusion is a connection region to be connected to the tab lead 2c. As illustrated in FIG. 3B, a portion of the negative-electrode mixture layer 2a on the connection region was scraped off to expose the negative-electrode current collector (copper foil) 2b. As illustrated in FIG. 3C, the exposed portion of the negative-electrode current collector (copper foil) 2b was connected to the negative-electrode tab lead 2c, and a predetermined region around the negative-electrode tab lead 2c was covered with an insulating tab film 6.

(3) Preparation of Non-Aqueous Electrolytic Solution

In a mixed solvent of fluoroethylene carbonate (CAS No. 114435-02-8) and dimethyl carbonate (CAS No. 616-38-6) (volume ratio: 1:4), 1.2 mol/L $LiPF_6$ (CAS No. 21324-40-3) was dissolved to prepare an electrolytic solution. The electrolytic solution was prepared in an Ar atmosphere in a glove box at a dew point of −60° C. or less and at an oxygen level of 1 ppm or less.

(4) Preparation of Evaluation Cell

The negative electrode for performance evaluation was used to prepare a half-cell for negative electrode evaluation. The half-cell included a lithium metal counter electrode. The evaluation cell was prepared in an Ar atmosphere in a glove box at a dew point of −60° C. or less and at an oxygen level of 1 ppm or less.

The negative electrode for performance evaluation connected to the negative-electrode tab lead 2c was put on the Li metal counter electrode connected to a nickel tab lead with a polypropylene separator 30 (30 μm in thickness) interposed therebetween to form an electrode assembly 4.

A 120×120 mm rectangular Al laminated film (100 μm in thickness) was folded in half. An end portion on the 120-mm long side was heat-sealed at 230° C. to form a 120×60 mm envelope. The electrode assembly 4 was inserted into the envelope through a 60-mm short side. An end face of the Al laminated film and a hot-melt resin of the tab leads 1c and 2c were aligned and heat-sealed at 230° C. Subsequently, 0.3 cm³ of a non-aqueous electrolytic solution was injected through an unsealed short side of the Al laminated film. Standing at a reduced pressure of 0.06 MPa for 15 minutes allowed the negative-electrode mixture layer 2a to be impregnated with the electrolytic solution. Finally, the unsealed end face of the Al laminated film was heat-sealed at 230° C.

(5) Evaluation of Battery Performance

The electrode assembly 4 in the laminate was placed between 80×80 cm stainless steel sheets (2 mm in thickness), and the evaluation cell was pressurized with clamps at 0.2 MPa. The evaluation was performed in a thermostat at 25° C.

Four cycles of charge-discharge were performed at a limited charge-discharge current with a current density of 20 mA per gram of the negative-electrode active material. Charging was completed at a negative-electrode potential of 0.0 V (vs. Li counter electrode), and discharging was completed at a negative-electrode potential of 1.0 V (vs. Li counter electrode). The battery was left standing in an open circuit for 20 minutes between charging and discharging.

Another cycle of charge-discharge was then performed under the same conditions. In this fifth cycle, the discharge capacity and irreversible capacity per weight of the graphite were determined.

Example 2

A negative-electrode active material for a non-aqueous secondary battery was synthesized in the same manner as in Example 1 except that the amount of boric acid was 5% by mass of the amount of petroleum coke powder in the synthesis of graphite. After heat treatment in the Ar atmosphere, the graphite material had an average particle size (median size) of 20 μm measured by laser diffractometry.

The graphite in the negative-electrode active material had a boron content of 0.18% by weight as determined by ICP spectrometry.

An analysis of the surface of the graphite by X-ray photoelectron spectroscopy showed a boron 1s spectrum in the binding energy range of 184.0 to 196.5 eV and a fluorine 1s spectrum in the binding energy range of 680.0 to 693.5 eV.

The ratio R (i.e., $S_{BB}/S_B$) was 0.68, wherein $S_B$ denotes the total peak area of the boron 1s spectrum of the graphite obtained by X-ray photoelectron spectroscopy, and $S_{BB}$ denotes the peak area of all spectra each having a peak in the binding energy range of 184.0 to 188.5 eV in the boron 1s spectrum.

An XPS measurement while etching the surface of the graphite with an Ar ion gun (2 kV, 7 mA) showed that the fluorine 1s spectrum was observed from the outermost surface to the depth of 80 nm.

Example 3

A negative-electrode active material for a non-aqueous secondary battery was synthesized in the same manner as in Example 1 except that the amount of boric acid was 20% by mass of the amount of petroleum coke powder in the synthesis of graphite. After heat treatment in the Ar atmosphere, the graphite material had an average particle size (median size) of 20 μm measured by laser diffractometry.

The graphite in the negative-electrode active material had a boron content of 0.48% by weight as determined by ICP spectrometry.

An analysis of the surface of the graphite by X-ray photoelectron spectroscopy showed a boron 1s spectrum in the binding energy range of 184.0 to 196.5 eV and a fluorine 1s spectrum in the binding energy range of 680.0 to 693.5 eV.

The $S_{BB}/S_B$ ratio R was 0.53, wherein $S_B$ denotes the total peak area of the boron 1s spectrum of the graphite obtained by X-ray photoelectron spectroscopy, and $S_{BB}$ denotes the peak area of all spectra each having a peak in the binding energy range of 184.0 to 188.5 eV in the boron 1s spectrum.

An XPS measurement while etching the surface of the graphite with an Ar ion gun (2 kV, 7 mA) showed that the fluorine 1s spectrum was observed from the outermost surface to the depth of 80 nm.

Example 4

A negative-electrode active material for a non-aqueous secondary battery was synthesized in the same manner as in Example 1 except that the holding time at 200° C. in the heat treatment of the graphite material in the $F_2$ atmosphere was 1 hour.

The graphite in the negative-electrode active material had a boron content of 0.33% by weight as determined by ICP spectrometry.

An analysis of the surface of the graphite by X-ray photoelectron spectroscopy showed a boron 1s spectrum in the binding energy range of 184.0 to 196.5 eV and a fluorine 1s spectrum in the binding energy range of 680.0 to 693.5 eV.

The $S_{BB}/S_B$ ratio R was 0.58, wherein $S_B$ denotes the total peak area of the boron 1s spectrum of the graphite obtained by X-ray photoelectron spectroscopy, and $S_{BB}$ denotes the peak area of all spectra each having a peak in the binding energy range of 184.0 to 188.5 eV in the boron 1s spectrum.

An XPS measurement while etching the surface of the graphite with an Ar ion gun (2 kV, 7 mA) showed that the fluorine 1s spectrum was observed from the outermost surface to the depth of 50 nm.

Comparative Example 1

A negative-electrode active material for a non-aqueous secondary battery was synthesized in the same manner as in Example 1 except that no heat treatment in the $F_2$ atmosphere was performed in the synthesis of graphite.

The graphite in the negative-electrode active material had a boron content of 0.35% by weight as determined by ICP spectrometry.

An analysis of the surface of the graphite by X-ray photoelectron spectroscopy showed a boron 1s spectrum in the binding energy range of 184.0 to 196.5 eV and a fluorine 1s spectrum in the binding energy range of 680.0 to 693.5 eV.

The $S_{BB}/S_B$ ratio R was 0.54, wherein $S_B$ denotes the total peak area of the boron 1s spectrum of the graphite obtained by X-ray photoelectron spectroscopy, and $S_{BB}$ denotes the peak area of all spectra each having a peak in the binding energy range of 184.0 to 188.5 eV in the boron 1s spectrum.

Comparative Example 2

A negative-electrode active material for a non-aqueous secondary battery was synthesized in the same manner as in Example 1 except that no boric acid was added in the synthesis of graphite.

An XPS measurement while etching the surface of the graphite with an Ar ion gun (2 kV, 7 mA) showed that the fluorine 1s spectrum was observed from the outermost surface to the depth of 80 nm.

Comparative Example 3

A negative-electrode active material for a non-aqueous secondary battery was synthesized in the same manner as in Example 1 except that no heat treatment in the $F_2$ atmosphere was performed and no boric acid was added in the synthesis of graphite.

Comparative Example 4

A negative-electrode active material for a non-aqueous secondary battery was synthesized in the same manner as in Example 1 except that the amount of boric acid was 30% by mass of the amount of petroleum coke powder in the synthesis of graphite. After heat treatment in the Ar atmosphere, the graphite material had an average particle size (median size) of 20 μm measured by laser diffractometry.

The graphite in the negative-electrode active material had a boron content of 0.65% by weight as determined by ICP spectrometry.

An analysis of the surface of the graphite by X-ray photoelectron spectroscopy showed a boron 1s spectrum in the binding energy range of 184.0 to 196.5 eV and a fluorine 1s spectrum in the binding energy range of 680.0 to 693.5 eV.

The $S_{BB}/S_B$ ratio R was 0.40, wherein $S_B$ denotes the total peak area of the boron 1s spectrum of the graphite obtained by X-ray photoelectron spectroscopy, and $S_{BB}$ denotes the peak area of all spectra each having a peak in the binding energy range of 184.0 to 188.5 eV in the boron 1s spectrum.

An XPS measurement while etching the surface of the graphite with an Ar ion gun (2 kV, 7 mA) showed that the fluorine 1s spectrum was observed from the outermost surface to the depth of 80 nm.

Comparative Example 5

Heat treatment in a $N_2$ atmosphere was performed instead of heat treatment in the Ar atmosphere in the synthesis of graphite. More specifically, a ground mixture of a petroleum coke powder and boric acid was heated from room temperature to 2800° C. at 10° C./min in a tube furnace in an $N_2$ atmosphere ($N_2$ gas flow rate: 1 L/min) and was held at 2800° C. for 1 hour. The resulting graphite material had an average particle size (median size) of 20 μm measured by laser diffractometry. Except for this, a negative-electrode active material for a non-aqueous secondary battery was synthesized in the same manner as in Example 1.

The graphite in the negative-electrode active material had a boron content of 0.35% by weight as determined by ICP spectrometry.

An analysis of the surface of the graphite by X-ray photoelectron spectroscopy showed a boron 1s spectrum in the binding energy range of 184.0 to 196.5 eV and a fluorine 1s spectrum in the binding energy range of 680.0 to 693.5 eV.

The $S_{BB}/S_B$ ratio R was 0.22, wherein $S_B$ denotes the total peak area of the boron 1s spectrum of the graphite obtained by X-ray photoelectron spectroscopy, and $S_{BB}$ denotes the peak area of all spectra each having a peak in the binding energy range of 184.0 to 188.5 eV in the boron 1s spectrum.

An XPS measurement while etching the surface of the graphite with an Ar ion gun (2 kV, 7 mA) showed that the fluorine 1s spectrum was observed from the outermost surface to the depth of 80 nm.

Electrode sheets and evaluation cells containing these negative-electrode active materials were produced in the same manner as in the battery of Example 1. The discharge capacity and irreversible capacity were measured as described above. Table 1 shows the results.

Table 1 lists the discharge capacities and irreversible capacities of the negative-electrode active materials of Examples 1 to 4 and Comparative Examples 1 to 5. Table 1 also lists the boron content, fluorine localization depth, and R ($=S_{BB}/S_B$).

A comparison of Comparative Example 1 with Comparative Example 3 shows that boron-containing graphite decreased the irreversible capacity but decreased the discharge capacity as compared with boron-free graphite.

A comparison between the negative-electrode active materials of Comparative Examples 2 and 3 shows that fluorine on the surface of boron-free graphite made no difference in discharge capacity and irreversible capacity.

A comparison of Comparative Example 1 with Examples 1 to 4, which contained fluorine on the surface of boron-containing graphite, shows that for the negative-electrode active materials of Examples 1 to 4, a decrease in discharge capacity due to the addition of boron was suppressed, and the irreversible capacity was decreased. Examples 1 to 4 had an $S_{BB}/S_B$ ratio in the range of 0.5 to 1.

A comparison of Example 1 with Comparative Example 1 shows that fluorine on the surface of graphite with almost the same boron content increased the discharge capacity.

These results show that fluorine on the surface of boron-containing graphite with an $S_{BB}/S_B$ ratio in the range of 0.5 to 1 can suppress a decrease in discharge capacity and decrease the irreversible capacity.

In the negative-electrode active materials of Comparative Examples 4 and 5, although the graphite contains boron and contains fluorine on its surface, the irreversible capacity was increased. This is probably because an $S_{BB}/S_B$ ratio of less than 0.5 and a large proportion of boron not dissolved in graphite resulted in an insufficient side reaction suppressing effect and an increased irreversible capacity. The negative-electrode active materials of Comparative Examples 4 and 5 had a lower discharge capacity than Examples 1 to 4.

In contrast, the negative-electrode active material of Example 2 with the highest $S_{BB}/S_B$ ratio of 0.68 among Examples 1 to 4 had a significantly decreased irreversible capacity.

In Examples 1 to 4, fluorine was observed at a depth in the range of 50 to 80 nm from the surface of the graphite.

Thus, the use of a negative-electrode active material containing fluorine on the surface of boron-containing graphite can increase the discharge capacity and decrease the irreversible capacity. A decrease in irreversible capacity can enhance reliability.

TABLE 1

| Negative-electrode active material | Boron content [mass %] | Fluorine localization depth [nm] | $S_{BB}/S_B$ | Discharge capacity [mAh/g] | Irreversible capacity [mAh/g] |
| --- | --- | --- | --- | --- | --- |
| Example 1 | 0.34 | 80 | 0.55 | 345 | 1.3 |
| Example 2 | 0.18 | 80 | 0.68 | 345 | 1.1 |
| Example 3 | 0.48 | 80 | 0.53 | 346 | 1.3 |
| Example 4 | 0.33 | 50 | 0.58 | 345 | 1.2 |
| Comparative example 1 | 0.35 | — | 0.54 | 339 | 1.3 |
| Comparative example 2 | — | 80 | — | 346 | 1.5 |
| Comparative example 3 | — | — | — | 346 | 1.5 |
| Comparative example 4 | 0.65 | 80 | 0.40 | 344 | 1.5 |
| Comparative example 5 | 0.35 | 80 | 0.22 | 337 | 1.5 |

A negative-electrode active material according to the present disclosure can be utilized in non-aqueous secondary batteries and is particularly useful as a negative-electrode material for non-aqueous secondary batteries, such as lithium-ion secondary batteries.

What is claimed is:

1. A negative-electrode active material for a non-aqueous secondary battery, the negative-electrode active material comprising a graphite including at least boron and fluorine, wherein:
    the fluorine is disposed at least on a surface of the graphite, and
    a ratio R satisfies 0.5≤R≤1, where R=$S_{BB}/S_B$, and $S_B$ denotes a total peak area of a boron 1s spectrum of the graphite obtained by X-ray photoelectron spectroscopy, and $S_{BB}$ denotes a peak area of all spectra which exist in the boron 1s spectrum of the graphite obtained by X-ray photoelectron spectroscopy and which each have a peak in a binding energy range of not less than 184.0 eV and not more than 188.5 eV.

2. The negative-electrode active material according to claim 1, wherein the fluorine is localized in a region 100 nm or less in depth from a surface of the graphite.

3. The negative-electrode active material according to claim 1, wherein the graphite includes the boron in an amount of not less than 0.01% by mass and not more than 5% by mass of a total amount of the graphite.

4. The negative-electrode active material battery according to claim 2, wherein the graphite includes the boron in an amount of not less than 0.01% by mass and not more than 5% by mass of a total amount of the graphite.

5. A non-aqueous secondary battery comprising:
    a positive electrode containing a positive-electrode active material that occludes and releases alkali metal ions;
    a negative electrode containing a negative-electrode active material; and
    a non-aqueous electrolytic solution, wherein:
    the negative-electrode active material comprises a graphite including at least boron and fluorine,
    the fluorine is disposed at least on a surface of the graphite, and a ratio R satisfies $0.5 \leq R \leq 1$, where $R = S_{BB}/S_B$, and $S_B$ denotes a total peak area of a boron $1s$ spectrum of the graphite obtained by X-ray photoelectron spectroscopy, and $S_{BB}$ denotes a peak area of all spectra which exist in the boron $1s$ spectrum of the graphite obtained by X-ray photoelectron spectroscopy and which each have a peak in a binding energy range of not less than 184.0 eV and not more than 188.5 eV.

6. The non-aqueous secondary battery according to claim 5, wherein the fluorine is localized in a region 100 nm or less in depth from a surface of the graphite.

7. The non-aqueous secondary battery according to claim 5, wherein the graphite includes the boron in an amount of not less than 0.01% by mass and not more than 5% by mass of a total amount of the graphite.

8. The non-aqueous secondary battery according to claim 6, wherein the graphite includes the boron in an amount of not less than 0.01% by mass and not more than 5% by mass of a total amount of the graphite.

9. The non-aqueous secondary battery according to claim 5, wherein the alkali metal ions are lithium ions.

10. The non-aqueous secondary battery according to claim 6, wherein the alkali metal ions are lithium ions.

11. The non-aqueous secondary battery according to claim 7, wherein the alkali metal ions are lithium ions.

12. The non-aqueous secondary battery according to claim 8, wherein the alkali metal ions are lithium ions.

* * * * *